(12) United States Patent
Tanaka et al.

(10) Patent No.: US 9,618,943 B2
(45) Date of Patent: Apr. 11, 2017

(54) FLUID CONTROL SYSTEM

(71) Applicant: HORIBA STEC, Co., Ltd., Kyoto-shi, Kyoto (JP)

(72) Inventors: Yuki Tanaka, Kyoto (JP); Akito Takahashi, Kyoto (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 0 days.

(21) Appl. No.: 14/065,042

(22) Filed: Oct. 28, 2013

(65) Prior Publication Data

US 2014/0116538 A1 May 1, 2014

(30) Foreign Application Priority Data

Oct. 29, 2012 (JP) .................. 2012-238407

(51) Int. Cl.
*F16K 31/02* (2006.01)
*G05D 7/06* (2006.01)

(52) U.S. Cl.
CPC ...... *G05D 7/0635* (2013.01); *Y10T 137/7759* (2015.04)

(58) Field of Classification Search
CPC ............... G05D 7/0635; G05D 7/0623; Y10T 137/7759
USPC ................ 137/486, 487.5; 706/903; 700/282
See application file for complete search history.

(56) References Cited

U.S. PATENT DOCUMENTS

| | | | | |
|---|---|---|---|---|
| 5,062,446 A * | 11/1991 | Anderson | ...................... | 137/468 |
| 5,944,048 A * | 8/1999 | Bump | .................. | G01F 1/6842 |
| | | | | 137/486 |
| 6,439,254 B1 * | 8/2002 | Huang et al. | .................... | 137/10 |
| 6,564,824 B2 * | 5/2003 | Lowery et al. | ............ | 137/487.5 |
| 6,830,061 B2 * | 12/2004 | Adams et al. | .................. | 137/12 |
| 7,363,182 B2 * | 4/2008 | Tison | ...................... | G01F 1/684 |
| | | | | 137/487.5 |
| 7,971,604 B2 * | 7/2011 | McDonald et al. | ........ | 137/487.5 |
| 8,128,059 B2 * | 3/2012 | Uechi et al. | ............. | 251/129.15 |
| 8,321,060 B2 * | 11/2012 | Smirnov | .............. | G05D 7/0635 |
| | | | | 700/282 |
| 8,915,262 B2 * | 12/2014 | Smirnov | ........................ | 137/486 |
| 9,141,114 B2 * | 9/2015 | Slupphaug | ........... | G05D 7/0635 |
| 9,146,563 B2 * | 9/2015 | Smirnov | ............... | G05D 7/0629 |
| 2007/0158607 A1 * | 7/2007 | Fey et al. | ................. | 251/129.16 |
| 2007/0215206 A1 * | 9/2007 | Lull et al. | ......................... | 137/10 |
| 2008/0140260 A1 * | 6/2008 | Ding | .............................. | 700/282 |

(Continued)

FOREIGN PATENT DOCUMENTS

| | | |
|---|---|---|
| JP | H06187046 A | 7/1994 |
| JP | 2001236125 A | 8/2001 |

(Continued)

OTHER PUBLICATIONS

Japan Patent Office, Office Action Issued in Application No. 2012-238407, Dec. 15, 2015, 2 pages.

*Primary Examiner* — Craig Schneider
*Assistant Examiner* — Minh Le
(74) *Attorney, Agent, or Firm* — Alleman Hall McCoy Russell & Tuttle LLP (57) ABSTRACT

At a time when control of a flow rate adjusting valve is initiated from a fully closed state in order to make a measured flow rate equal to a target flow rate, an initial value of a driving signal is set as a parameter by making use of at least one of the type, pressure, and temperature of a fluid.

5 Claims, 6 Drawing Sheets (56) References Cited

U.S. PATENT DOCUMENTS

| | | | |
|---|---|---|---|
| 2009/0222180 A1* | 9/2009 | Kraenzlein et al. | 701/59 |
| 2010/0000608 A1* | 1/2010 | Goto et al. | 137/2 |
| 2010/0018592 A1* | 1/2010 | Parker | G05D 7/0635 137/487.5 |
| 2010/0036534 A1* | 2/2010 | Ding | 700/282 |
| 2012/0116596 A1* | 5/2012 | Yoneda | G05D 7/0635 700/282 |
| 2012/0132291 A1* | 5/2012 | Monkowski | F15D 1/025 137/14 |
| 2013/0092256 A1* | 4/2013 | Yasuda et al. | 137/487 |
| 2014/0190571 A1* | 7/2014 | Ding et al. | 137/1 |

FOREIGN PATENT DOCUMENTS

| | | |
|---|---|---|
| JP | 2008506190 A | 2/2008 |
| WO | 2006014510 A1 | 2/2006 |

* cited by examiner

FLUID CONTROL SYSTEM

FIELD OF THE ART

This invention relates to a fluid control system that controls a flow rate of a material gas used in, for example, a semiconductor manufacturing process.

BACKGROUND ART

This type of fluid control system has a flow rate sensor and a flow rate adjusting valve arranged on a flow channel in which a fluid flows, and is so configured to conduct feedback control on the flow rate adjusting valve so as to make a measured flow rate of the fluid measured by the flow rate sensor equal to a target flow rate by means of an integrally or separately provided control circuit.

At a time when the fluid begins flowing, namely when control of the flow rate is initiated from the fully open state toward a target flow rate, if the feedback control is conducted from the measured flow rate, it may take time for the measured flow rate to settle at the target flow rate. This is because the flow rate adjusting valve does not begin moving unless the value of the driving signal exceeds a certain threshold. Then, if the feedback control for calculating the driving signal value (the applied voltage) of the flow rate adjusting valve, in accordance with the deviation between the target flow rate and the measured flow rate, is performed from the target flow rate, the applied voltage calculated in the first several control loops does not exceed the threshold so that the time for the first several control loops until the flow rate adjusting valve actually begins moving is wasted.

It is a matter of course that it is possible to improve responsiveness by setting the applied voltage output based on the deviation so as to immediately exceed the threshold by increasing a control coefficient, however, with this arrangement, it is very probable that oscillation is generated so that the control becomes unstable.

Then, in the patent document 1, at a time when the flow rate control is initiated from the fully closed state, the applied voltage that is first output is compulsorily set to be a value exceeding the threshold, and the value is assumed to be the initial value (the initial applied voltage) and the feedback control is initiated with this initial value.

PRIOR ART DOCUMENTS

Patent Documents

Patent document 1: Japanese Unexamined Patent Application Publication No. 2001-236125

DISCLOSURE OF THE INVENTION

Problems to be Solved by the Invention

However, the inventor of this invention has found that there is a case that the flow rate adjusting valve does not begin moving and consequently fails in responsiveness even though the initial applied voltage is determined to be at a value at which the flow rate adjusting valve is supposed to move. Then, after a keen examination of this phenomenon, the inventor of this invention has found that this phenomenon is due to the fluctuation of a dead zone in the flow rate adjusting valve which results from changes in the type, pressure, and temperature of the fluid.

Figure 4:
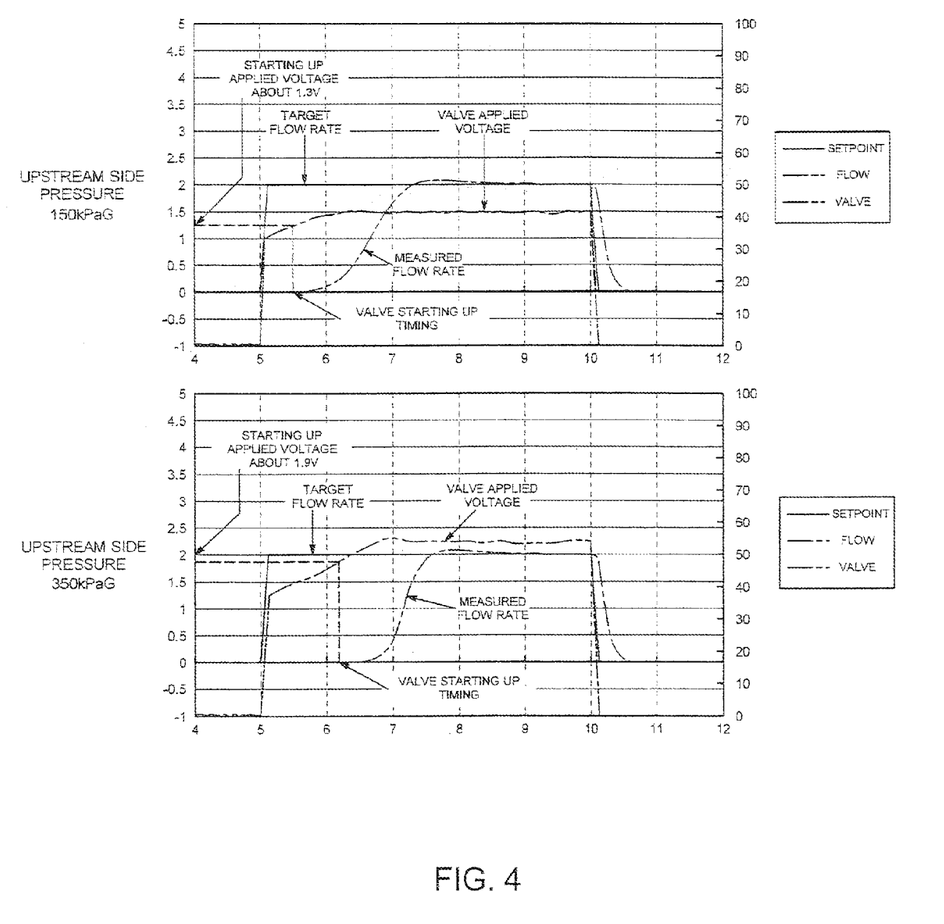
FIG. 4 is an experiment graph showing a change in starting up applied voltage of the flow rate adjusting valve at a time when the pressure in the upstream side changes.
Figure 5:
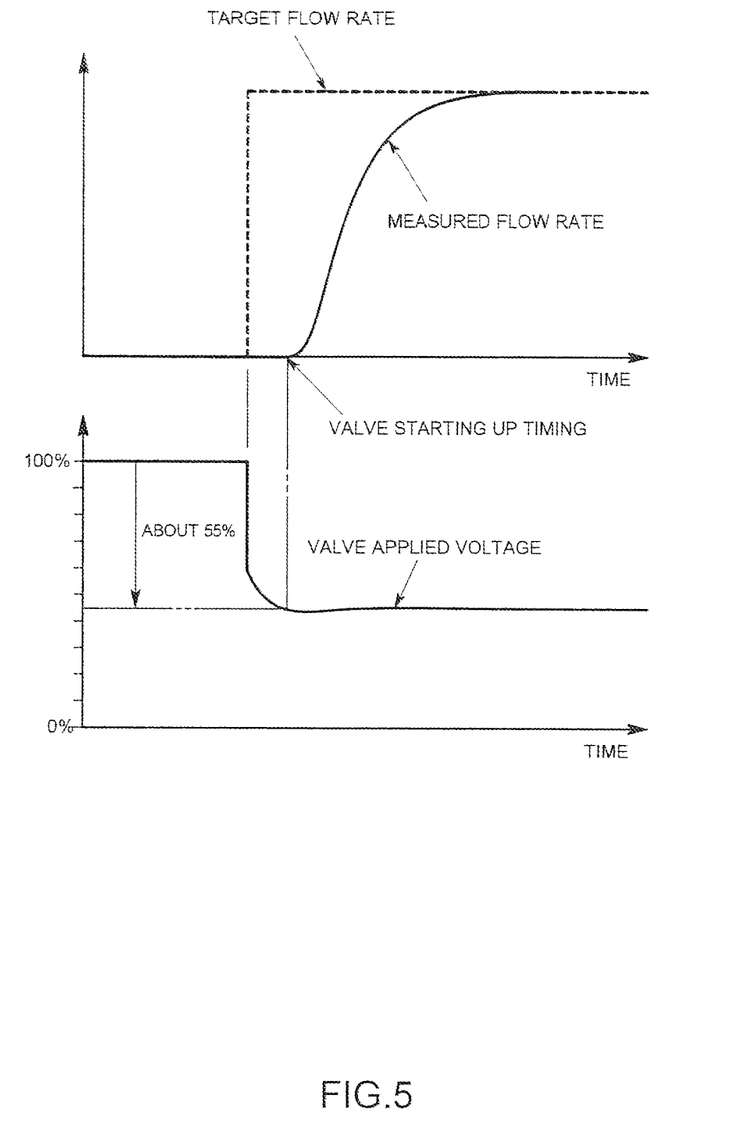
FIG. 5 is an experiment graph showing a change in starting up applied voltage of the flow rate adjusting valve at a time when $N_2$ gas flows.

For example, FIG. 4 shows a change in the starting up applied voltage of the flow rate adjusting valve at a time when a pressure in the upstream side of the flow rate adjusting valve changes. At a time when the pressure in the upstream side is 150 KPaG, the flow rate adjusting valve begins moving when the applied voltage is about 1.3V. At a time when the pressure in the upstream side reaches 350 KPaG, the flow rate adjusting valve begins moving at last when the applied voltage is about 1.9V. As a result of this, it turns out that when the flow rate control is initiated from the fully closed state toward the target flow rate, the flow rate adjusting valve begins moving and the flow rate control is conducted in a relatively short period of time when the pressure is 150 KPaG, while it takes considerable time for the flow rate adjusting valve to begin moving so that it takes much time for the measured flow rate to reach the target flow rate when the pressure is 350 KPaG, although the initial applied voltage is set almost the same. The structure of the flow rate adjusting valve is to urge the valve body to the closed side by the fluid pressure in the upstream side so that the higher the pressure is, the bigger the force that is necessary to move the valve body becomes. It can be inferred that the starting up applied voltage of the flow rate adjusting valve changes because of this structure.

Figure 6:
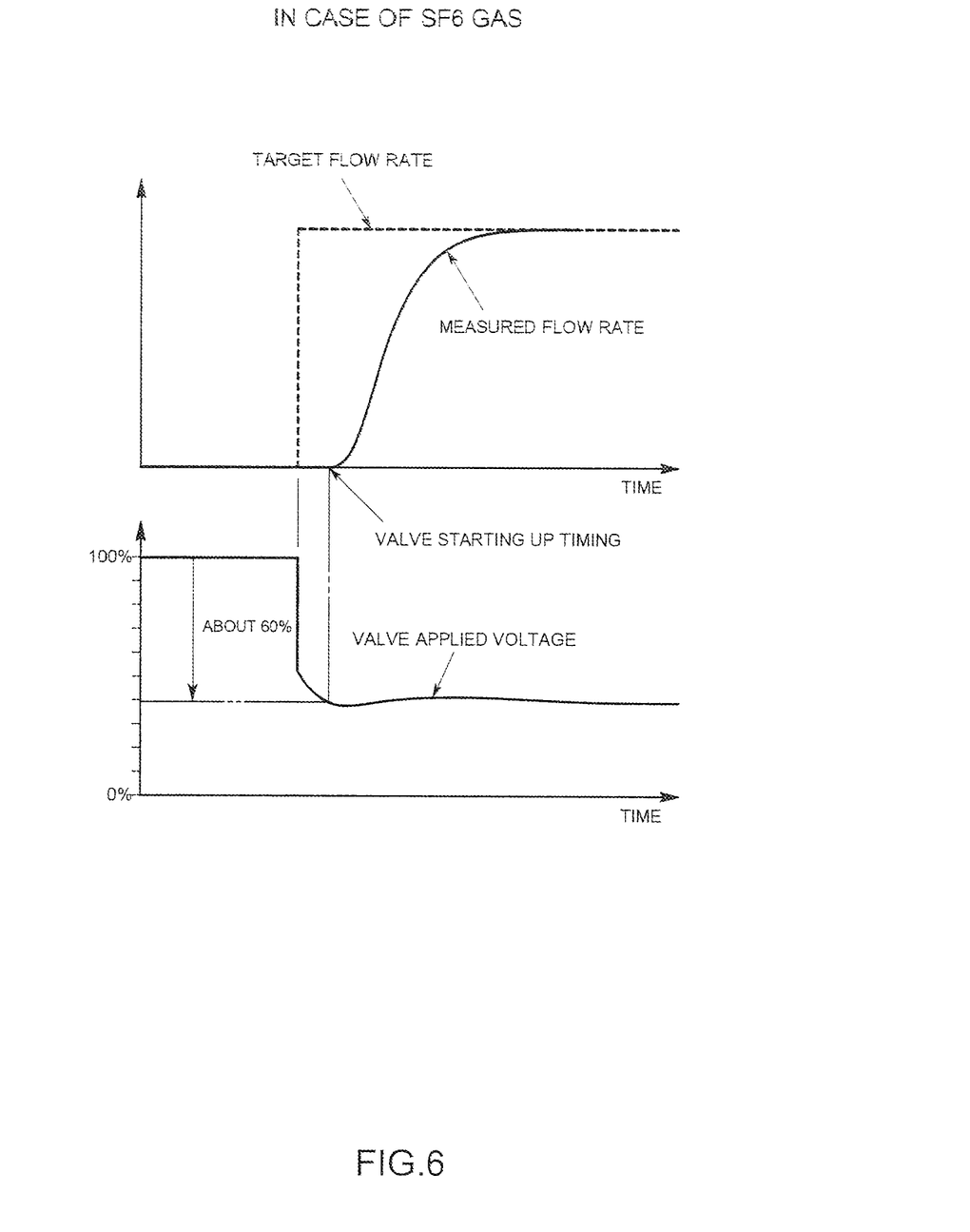
FIG. 6 is an experiment graph showing a change in starting up applied voltage of the flow rate adjusting valve at a time when $SF_6$ gas flows.

In addition, FIG. 6 and FIG. 7 show a change in the starting up applied voltage of the flow rate adjusting valve at a time when the type of fluid changes. In FIG. 6 and FIG. 7, $N_2$ gas and $SF_6$ gas are compared. It is necessary to increase the change in applied voltage for a gas ($N_2$ gas) with a greater molecular weight in order to move the flow rate adjusting valve for flowing the fluid (in this embodiment, since the flow rate adjusting valve of a normal open type is used, it is necessary to increase the range of reduction of the applied voltage for the gas with a greater molecular weight).

The present claimed invention intends to solve all of the above-mentioned problems of the flow rate adjusting valve and a main object of this invention is to make it possible for the flow rate, at a time when the control of the flow rate adjusting valve is initiated in order to make the measured flow rate equal to the target flow rate from the fully closed state to reach the target flow rate as quickly as possible and to control the flow rate stably irrespective of the ambient situation.

Means to Solve the Problems

More specifically, the fluid control system in accordance with this invention comprises a flow rate adjusting valve that adjusts a flow rate of a fluid flowing in a flow channel by changing an open degree of the flow rate adjusting valve in accordance with a value of a driving signal, a flow rate sensor that measures the flow rate of the fluid that flows in the flow channel, and a control circuit that controls the flow rate adjusting valve by outputting the driving signal so as to make a measured flow rate obtained by the flow rate sensor equal to a given target flow rate, and is characterized by that at a time when the control circuit initiates control of the flow rate adjusting valve from a fully closed state in order to make the measured flow rate equal to the target flow rate, an initial value of the driving signal is set by the use of at least one of a kind, pressure and temperature of the fluid at the time as a parameter.

Effect of the Invention

In accordance with this arrangement, even though the dead zone in the flow rate adjusting valve fluctuates due to the type, pressure, and temperature of the fluid, since the initial value of the driving signal, namely a first value of the driving signal to be given to the flow rate adjusting valve from the fully closed state, changes in accordance with the type, pressure, and temperature of the fluid, at a time when control of the flow rate adjusting valve is initiated from the fully closed state in order to make the measured flow rate equal to the target flow rate, it is possible to make the flow rate reach the target flow rate quickly and to control the flow rate stably irrespective of the ambient situation.

The optimum initial value of the driving signal determined by the use of the type, pressure, or temperature of the fluid as the parameter has an instrumental error and changes in accordance with change over time of properties of the flow rate adjusting valve or its peripheral devices.

In order to cope with this, it is preferable to provide a learning function.

As a concrete embodiment of this, it is preferable that the control circuit comprises a memory part that memorizes in pairs a starting up driving signal value, being the driving signal value at a time when the flow rate adjusting valve begins moving from a fully closed state, and at least one of the type, pressure, and temperature of the fluid at the time, as well as an initial value of the driving signal setting part that sets the initial value of the driving signal by referring to a past starting up driving signal value stored in the memory part by the use of at least one of the type, pressure, and temperature of the fluid as the parameter at a time when the control circuit initiates control of the flow rate adjusting valve from the fully closed state in order to make the measured flow rate equal to the target flow rate.

In addition, another described embodiment of the learning function is that the control circuit obtains the starting up driving signal value, which as discussed above is a value of a driving signal at a time when the flow rate adjusting valve initiates moving from the fully closed state, and at least one of the type, pressure, and temperature of the fluid at this time and updates a function or a table wherein the type, pressure, or temperature of the fluid is determined as the parameter, and said function or table is used for obtaining the initial value of the driving signal based on these relationships.

From a view point of making a dedicated sensor unnecessary, it is preferable that the starting up driving signal value is the driving signal value at a time when the flow rate that first exceeds zero from the fully closed state is measured by the flow rate measuring device.

The fluid control system can be applied to not only flow rate control but also pressure control. More specifically, the pressure control system may comprise a pressure adjusting valve that adjusts the pressure of the fluid flowing in a channel by changing the open degree of a valve in accordance with the value of the driving signal, a pressure measuring device for measuring the pressure of the fluid flowing in the channel, and a control circuit that controls the pressure adjusting valve by outputting the driving signal so as to make a measured pressure obtained by the pressure measuring device equal to a given target pressure, wherein at a time when the control circuit initiates controlling the pressure adjusting valve from the fully closed state in order to make the measured pressure equal to the target pressure, an initial value of the driving signal is set by making use of at least one of the type, the flow rate, and the temperature of the fluid as the parameter.

BEST MODES OF EMBODYING THE INVENTION

An embodiment of this invention will be explained with reference to drawings.

Figure 1:
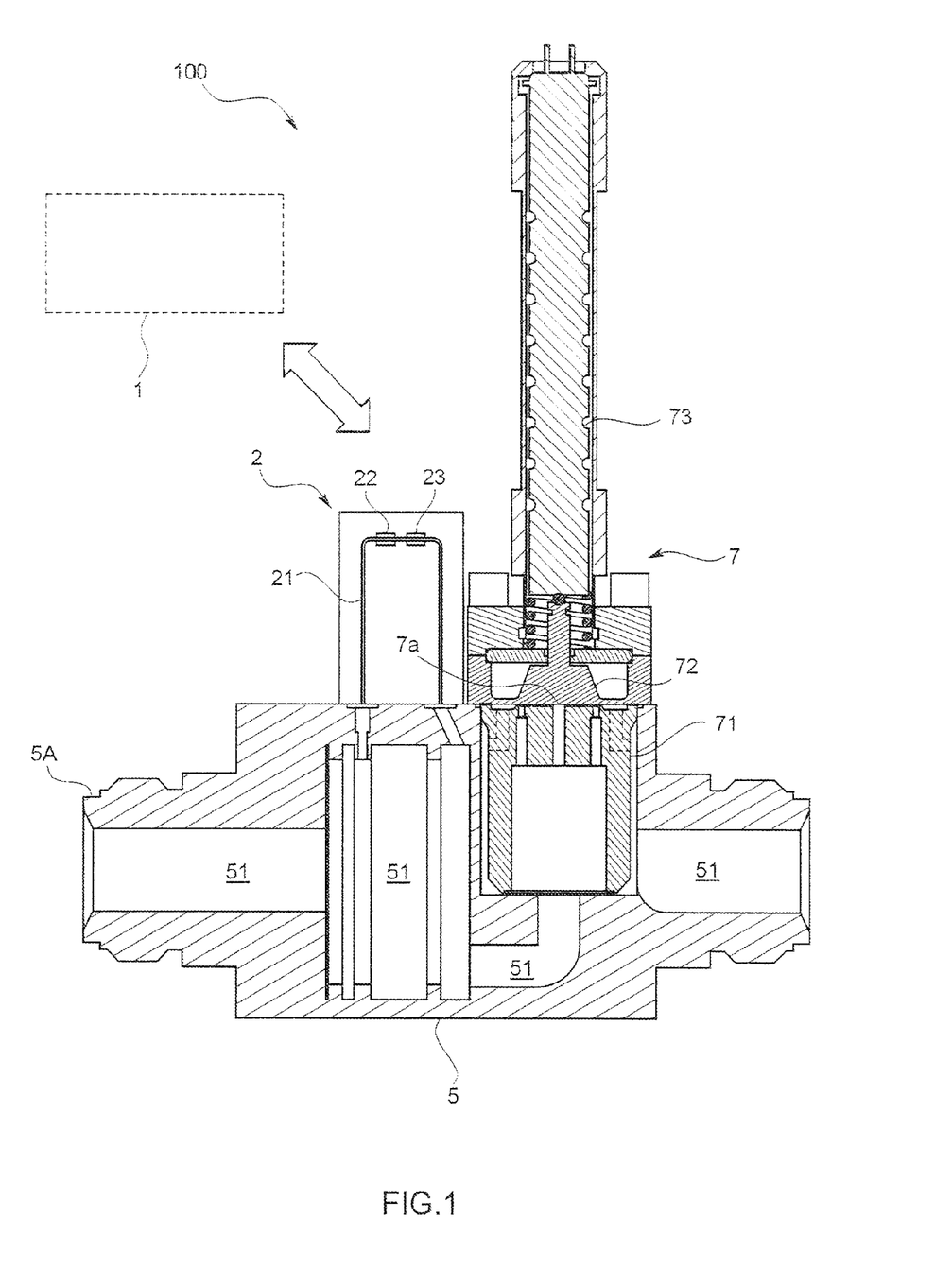
FIG. 1 is a general view of a fluid control system in accordance with one embodiment of this invention.

This embodiment of a fluid control system is, as shown in FIG. 1, to control the flow rate of a fluid such as a material gas used for manufacturing a semiconductor, and comprises a body 5 into which a flow channel 51 where the fluid flow penetrates, a flow rate adjusting valve 7 arranged on the flow channel 51, a flow rate measuring device 2 that is arranged in the upstream side of the flow rate adjusting valve 7 and that measures the flow rate of the fluid flowing in the flow channel 51 and a control circuit 1 that controls the open degree of the flow rate adjusting valve 7 so as to make the measured flow rate measured by the flow rate measuring device 2 equal to a previously determined target flow rate.

Figure 2:
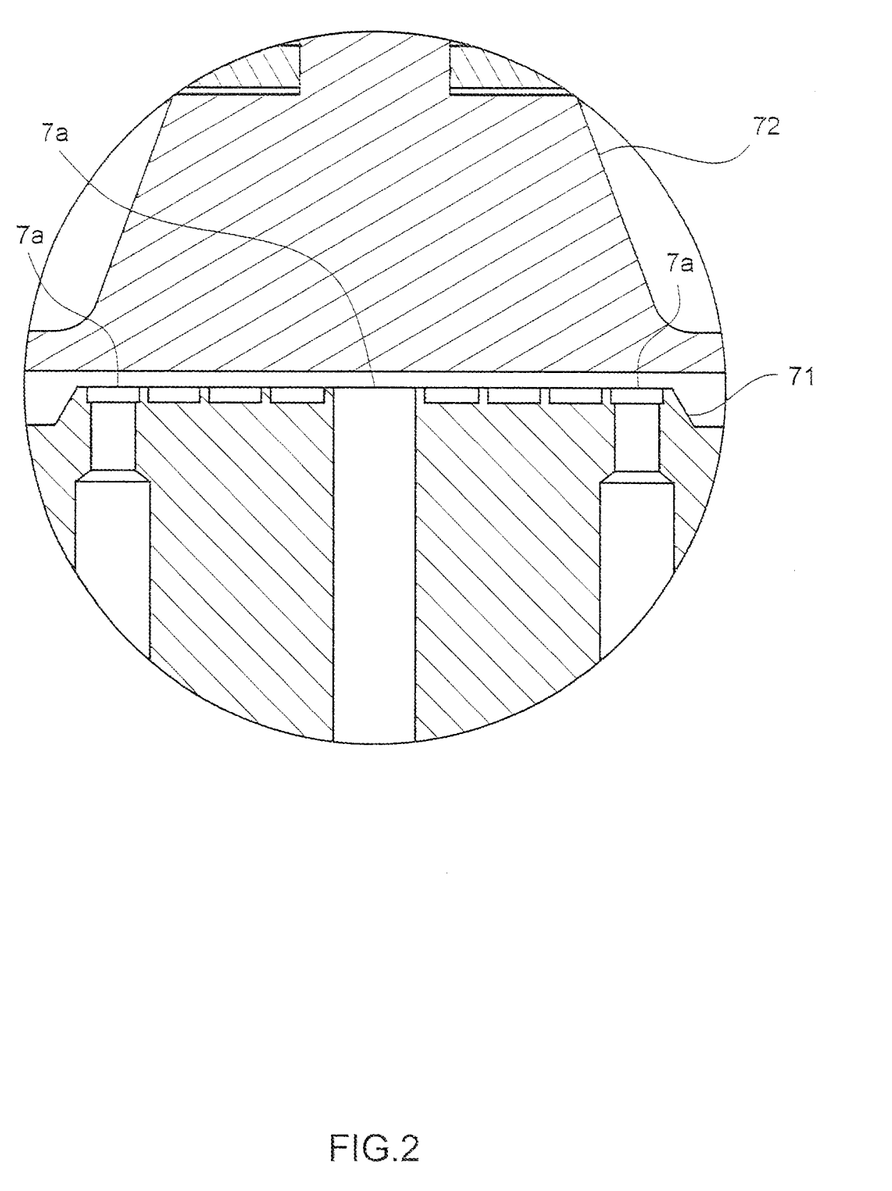
FIG. 2 is an enlarged view of a valve body and a valve seat in accordance with this embodiment.

The flow rate adjusting valve 7 comprises, as shown in FIG. 1 and FIG. 2, a valve seat 71 where an opening 7a from which the fluid flowing through the flow channel 51 flows out is formed, a valve body 72 that is arranged on the valve seat 71, is able to be separated from the valve seat 71 or attached to the valve seat 71, and that opens or closes the opening 7a, and a piezoelectric actuator 73 that is connected to the back side of the valve body 72 and that moves the valve body 72 in a separate manner from the valve seat 71 or in an attached manner to the valve seat 71. When a voltage signal, which is driving signal, is given to the piezoelectric actuator 73, the piezoelectric actuator 73 expands and contracts so that the distance between the valve body 72 and the opening 7a changes and the open degree of the flow rate adjusting valve 7 changes. The flow rate adjusting valve 7 is of a normal open type wherein the valve body 72 is in a fully open state, namely the valve body 72 is separated from the opening 7a at the most when no voltage is applied.

It may be conceived that the flow rate measuring device 2 is a thermal type, a differential pressure type, a Coriolis type, or an ultrasonic type, however, this embodiment employs the flow rate measuring device 2 of the thermal type. More concretely, the flow rate measuring device 2 comprises a small tube 21 connected to the flow channel 51 in parallel so as to introduce the fluid in a predetermined ratio to the fluid flowing in the flow channel 51, a heater, not shown in drawings, arranged in the small tube 21, and a pair of temperature sensors 22, 23 arranged in the upstream and downstream sides of the heater. When the fluid flows in the small tube 21, a temperature difference occurs between two temperature sensors 22, 23 in accordance with the mass flow rate of the fluid so that the flow rate can be calculated based on the temperature difference. A flow rate calculating part 11 arranged on the control circuit 1, to be described later, calculates the flow rate based on the temperature difference.

Figure 3:
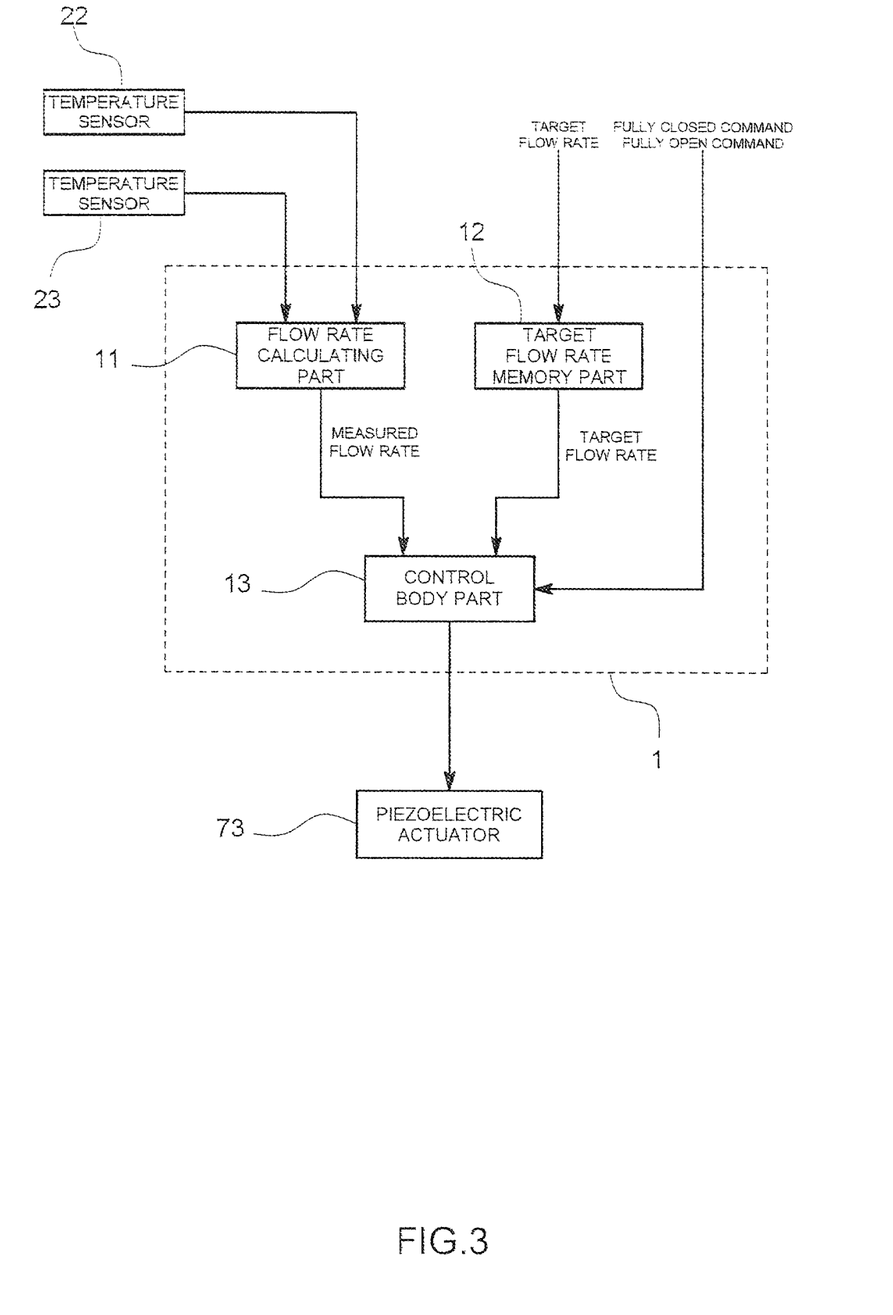
FIG. 3 is a functional block view of a control circuit in accordance with this embodiment.

The control circuit 1 is an analog and digital mixed circuit that comprises a CPU, a memory, an A/D converter, a D/A converter, an amplifier, and a communication interface, and produces functions as a target flow rate memory part 12 and a control body part 13, in addition to the above-mentioned flow rate calculating part 11 as shown in FIG. 3, by working cooperatively with the CPU and its peripheral devices based on programs stored in the memory.

Next, a concrete function of the control circuit 1 will be explained.

The control circuit 1 fundamentally conducts feedback control on the flow rate adjusting valve 7 so as to make the measured flow rate calculated based on the output from the flow rate measuring device 2 equal to the target flow rate received from, for example, an outside device. In addition, in case of receiving a fully closed command or a fully open command, it is possible for the control circuit 1 to compulsorily set a valve open degree irrespective of the target flow rate.

Next, a fundamental feedback control movement by the control circuit 1 will be explained.

The target flow rate is stored in the target flow rate memory part 12 arranged on the memory. The target flow rate can be updated by a command from, for example, an outside device.

The control body part 13 calculates the deviation between the measured flow rate measured by the flow rate measuring device 2 and the flow rate calculating part 11 and the target flow rate stored in the target flow rate memory part 12, calculates an applied voltage so as to offset the deviation by means of, for example, a PID operation, and outputs the applied voltage to the flow rate adjusting valve 7. The control circuit 1 conducts feedback control on the flow rate adjusting valve 7 so as to make the measured flow rate equal to the target flow rate by repeating a control loop.

Meanwhile, at a time when the fully closed command or the fully open command is received, the control body part 13 does not conduct the feedback control, namely, it outputs the previously determined fully closed applied voltage or the previously determined fully open applied voltage without referring to the target flow rate or the measured flow rate. Since the flow rate adjusting valve 7 is of the normal open type, the fully open applied voltage is zero and the fully closed applied voltage is the rated maximum voltage of the flow rate adjusting valve 7.

Then, in this embodiment, at a time when the feedback control toward the target flow rate that exceeds a previously determined constant value is initiated from the fully closed state, namely a state wherein the fully closed command is output or the measured flow rate is zero with the target flow rate set to be zero (hereinafter also called an initial time), an initial applied voltage that is given for the first time (an initial value of a driving signal in claims) is determined in accordance with a type, pressure, and temperature of the fluid at this time. Succeedingly, the feed back control is initiated.

The relationship between an initial change voltage, being a change amount from the fully closed voltage to the initial applied voltage, and the type, pressure, and temperature of the fluid is concretely as follows.

Regarding the relationship with the type of the fluid, the initial change voltage is set to be greater for a fluid with a higher viscosity so as to increase a force to open the flow rate adjusting valve 7 at the initial time. A fluid with a high viscosity is, for example, a semiconductor material gas with a high molecular weight. The control body part 13 recognizes the type of fluid by means of information on the type of fluid transmitted from, for example, an outside device.

Regarding the relationship with the pressure of the fluid, the initial change voltage is set to be bigger for a fluid with a lower pressure in the upstream side of the flow rate adjusting valve 7 so as to increase the force to open the flow rate adjusting valve 7 at the initial time. The control body part 13 obtains the pressure of the fluid in the upstream side from a pressure sensor, not shown in drawings.

Regarding the relationship with the temperature of the fluid, the initial change voltage is set to be bigger for the fluid with a lower temperature so as to increase the force to open the flow rate adjusting valve 7 at the initial time. The control body part 13 obtains the temperature of the fluid from, for example, a temperature sensor, not shown in drawings, arranged inside of the body 5.

In order to facilitate understanding, a more concrete example of a method for setting the initial change voltage will be explained. A reference change voltage is previously determined, voltage setting coefficients are set respectively according to the type, pressure, and temperature of the fluid, and the initial change voltage is calculated by multiplying the previously determined reference change voltage by the voltage setting coefficients that are determined based on the obtained type, pressure, and temperature of the fluid. For example, in the case that the reference change voltage is 2V, the voltage setting coefficient depending on the type of the fluid is 0.9, the voltage setting coefficient depending of the pressure of the fluid is 1.2, and the voltage setting coefficient depending on the temperature of the fluid is 1, the initial change voltage is calculated as 2*0.9*1.2*1=2.16 V. Then, if the fully closed applied voltage is 5 V, the initial applied voltage becomes 5−2.16=2.84 V by subtracting the initial change voltage from the fully closed applied voltage.

In accordance with this arrangement, even though a dead zone of the flow rate adjusting valve 7 fluctuates due to the type, pressure, and temperature of the fluid, since the initial value of the driving signal that is given to the flow rate adjusting valve 7 changes in accordance with the fluctuation of the dead zone, at a time when control of the flow rate adjusting valve is initiated from the fully closed state in order to make the measured flow rate equal to the target flow rate, it is possible both to quickly reach the flow rate to the target flow rate and to control the flow rate stably irrespective of the ambient situation.

The present claimed invention is not limited to the above-mentioned embodiment. For example, in the case of the flow rate adjusting valve of the normal closed type, since the fully closed applied voltage becomes zero, the initial applied voltage can be calculated by adding the initial change voltage to the fully closed applied voltage.

In addition, in the above-mentioned embodiment, all of the type, pressure, and temperature of the fluid are used as the parameter for determining the initial applied voltage. However, at least one of them may be used.

The initial value of the driving signal may be calculated based on a function or a table wherein the type, pressure, or temperature of the fluid is previously determined as the parameter and that is for obtaining the initial value of the driving signal.

The initial change voltage (the initial value of the driving signal) may be calculated based on a previously determined table or function wherein the parameter is the type, pressure, or temperature of the fluid. The table or the function may be previously stored in the memory or obtained by means of a test at the time of shipping or simulations.

The optimum initial value of the driving signal that is determined with the type, pressure, or temperature of the fluid as the parameter has an instrumental error and the optimum initial value of the driving signal may change due to a change over time while the flow rate control valve or its peripheral devices are used. In order to cope with the instrumental error or the change over time, it is preferable to provide a learning function.

Concretely, the control circuit is provided with a memory part that memorizes in pairs the starting up driving signal value, being a value of the driving signal at the time when the flow rate adjusting valve begins moving from the fully closed state, and at least one of the type, pressure, and temperature of the fluid at this time so as to make it possible to refer to a past starting up driving signal value. At a time when control of the flow rate adjusting valve is initiated from the fully closed state in order to make the measured flow rate equal to the target flow rate, the control circuit measures the type, pressure, or temperature of the fluid, detects an ambient condition that is near the measured parameter condition by more than a certain amount from the memory part and sets the driving signal value that is in pair with its ambient condition as the initial value of the driving signal. In addition, the initial value of the driving signal may be determined by correcting the driving signal value by the use of the deviation between the measured parameter condition and the ambient condition.

A mode of the other learning function represented is that the control circuit obtains the starting up driving signal value, being a value of the driving signal at the time when the flow rate adjusting valve begins moving from the fully closed state, and at least one of the type, pressure, and temperature of the fluid at this time, and updates the function or the table for obtaining the initial value of the driving signal based on these relationships.

From a view point of making a dedicated sensor unrequired, it is preferable that a value of the starting up driving signal is the driving signal value at a time when the flow rate that first exceeds zero from the fully closed state is measured by the flow rate measuring device.

The structure in the above-mentioned embodiment is to urge the valve body in the open side by the fluid pressure in the upstream side, and the higher the pressure is, the smaller a force required to move the valve body becomes. In other words, since the force required to move the valve body becomes bigger for a fluid with a lower pressure, the relationship between the initial applied voltage and the pressure is so set to make the force to open the valve at an initial time great by increasing the initial applied voltage for a fluid with a lower pressure. However, in the case that the structure is to urge the valve body in the closed side by the fluid pressure in the upstream side, the relationship between the initial applied voltage and the pressure becomes the inverse.

In addition, if the structure is so that the higher the temperature is, the more difficult the valve body moves because the friction increases due to expansion, it is necessary to increase the initial applied voltage much more for a fluid with a higher temperature.

Furthermore, the present claimed invention can be applied not only to the flow rate control but also to the pressure control. More specifically, it is possible to apply to the pressure control system comprising a pressure adjusting valve that adjusts a pressure of a fluid flowing in a channel by changing an open degree of the pressure adjusting valve in accordance with a value of a driving signal, a pressure measuring device for measuring the pressure of the fluid flowing in the channel, and a control circuit that controls the pressure adjusting valve by outputting the driving signal so as to make a measured pressure obtained by the pressure measuring device equal to a given target pressure.

In this case, at a time when the control circuit initiates control of the pressure adjusting valve from the fully closed state in order to make the measured pressure equal to the target pressure, it may be so configured that the initial value of the driving signal is set with at least one of the type, the flow rate, and the temperature of the fluid as the parameter.

In addition, a part or all of the above-mentioned embodiment or the modified the embodiment may be appropriately combined, and it is a matter of course that the present claimed invention is not limited to the above-mentioned embodiment and may be variously modified without departing from a spirit of the invention.

EXPLANATION OF REFERENCE CHARACTERS

100 . . . fluid control system
1 . . . control circuit
2 . . . flow rate measuring device
51 . . . flow channel
7 . . . flow rate adjusting valve

The invention claimed is:

1. A fluid control system comprising a flow rate adjusting valve that adjusts a flow rate of a fluid flowing in a flow channel by changing an open degree of the flow rate adjusting valve in accordance with a value of a driving signal, a flow rate measuring device for measuring the flow rate of the fluid that flows in the flow channel, and a control circuit that conducts feedback control on the flow rate adjusting valve by outputting the driving signal so as to make a measured flow rate obtained by the flow rate measuring device equal to a given target flow rate, wherein
the control circuit comprises an initial value generation part which outputs an initial value of the driving signal applied to the flow rate adjusting valve at a time when the control circuit initiates control of the flow rate adjusting valve from a fully closed state; and
the initial value generation part does not conduct the feedback control, but sets an initial value of the driving signal by the use of at least a type of the fluid or a temperature of the fluid at a time, as a parameter, wherein
the initial value of the driving signal is set based on the type of the fluid or the temperature of the fluid that is detected at a time when the feedback control is not being conducted.

2. The fluid control system described in claim 1, wherein
the control circuit stores in a memory part, in pairs, a starting up driving signal value, being the value of the driving signal at a time when the flow rate adjusting valve begins moving from the fully closed state, and at least the type of the fluid or temperature of the fluid at the time, and
at a time when the control circuit initiates control of the flow rate adjusting valve from the fully closed state in order to make the measured flow rate equal to the target flow rate, the control circuit sets the initial value of the driving signal by referring to the starting up driving signal value stored in the memory part by the use of at least the type of the fluid or the temperature of the fluid at the time, as a parameter.

3. The fluid control system described in claim 1, wherein the control circuit calculates the initial value of the driving signal based on a function or a table where at least the type of the fluid or the temperature of the fluid is a parameter.

4. The fluid control system described in claim 3, wherein the control circuit obtains a starting up driving signal value, being the value of the driving signal at a time when the flow rate adjusting valve begins moving from the fully closed state, from at least the type of the fluid or the temperature of the fluid at the time, and rewrites the function or the table based on these relationships.

5. A fluid control system comprising a flow rate adjusting valve that adjusts a flow rate of a fluid flowing in a flow channel by changing an open degree of the flow rate adjusting valve in accordance with a value of a driving signal, a flow rate measuring device for measuring the flow rate of the fluid that flows in the flow channel, and a control circuit that controls the flow rate adjusting valve by outputting the driving signal so as to make a measured flow rate obtained by the flow rate measuring device equal to a given target flow rate, wherein at a time when the control circuit initiates control of the flow rate adjusting valve from a fully closed state in order to make the measured flow rate equal to the target flow rate, an initial value of the driving signal is set by the use of at least one of a type, a pressure, and a temperature of the fluid at the time as a parameter, wherein the control circuit stores in pairs a starting up driving signal value, being the value of the driving signal at a time when the flow rate adjusting valve begins moving from the fully closed state, and at least one of the type, pressure, and temperature of the fluid at the time in a memory part, and at a time when the control circuit initiates control of the flow rate adjusting valve from the fully closed state in order to make the measured flow rate equal to the target flow rate, the control circuit sets the initial value of the driving signal by referring to the starting up driving signal value stored in the memory part by the use of at least one of the type, pressure, and temperature of the fluid at the time as the parameter, and wherein the driving signal value at a time when the flow rate first exceeds zero from the fully closed state as measured by the flow rate measurement device is set as the starting up driving signal value.

* * * * *